James Ingram.
Method of Attaching Floats & Sinkers to Fish Lines.
N° 99572. PATENTED FEB 8 1870

Witnesses
Jos. L. Coombs
F. H. Smith

Inventor.
James Ingram
by Cha. L. Coombs
Atty.

United States Patent Office.

JAMES INGRAM, OF TROY, NEW YORK.

Letters Patent No. 99,572, dated February 8, 1870.

METHOD OF ATTACHING FLOATS AND SINKERS TO FISHING-LINES.

The Schedule referred to in these Letters Patent and making part of the same.

I, JAMES INGRAM, of the city of Troy, in the county of Rensselaer, and State of New York, have invented certain Improvements in the Method of Attaching Floats and Sinkers to Fish-Lines, of which the following is a specification.

My invention relates to a device by means of which a float or sinker may be attached directly to any portion of a fish-line, without the necessity of proceeding to the end of the line to attach it.

The ordinary float is usually constructed with a wire loop at its lower end, and a small section of quill slipped over the upper extremity, by means of which it is confined to the line, and, in order to attach it, the end of the line has to be passed through the loop and quill, which necessitates the unwinding of the line from the reel or the removal of the hook, which is very inconvenient.

Figure 1:
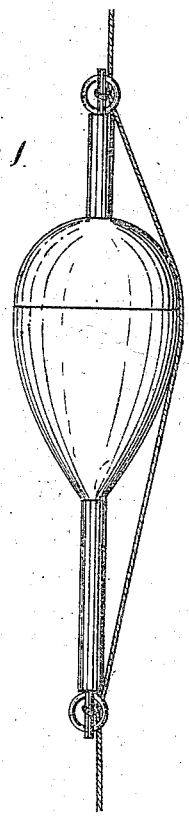
Figure 2:

Figure 1 is a view of the float, with the device attached;

Figure 2, a view of the sinker; and

Figure 3:

Figure 3, a view of one end of the float-pin, with the device attached.

In the drawing—

$a$ represents the body of the float or sinker, which is constructed in the ordinary manner.

To the ends of the pin $b$, passing through the float or the ends of the sinker, are attached the wire loops $c$, in any suitable manner, as in the ordinary float or sinker.

From each end of the pin $b$, or the sinker, project the short pins $d$, pressing against the loops $c$, and passing to a short distance beyond them.

The wire of which the loops and pins are made should possess some degree of elasticity, in order that when the loops and pin are pressed apart, and the pressure removed, they may resume their original position.

To attach the float or sinker to the line, the line is doubled, so as to form a loop, which is passed through the wire loop at the end of the float or sinker, from the side opposite the pin $d$. The loop is then passed over the end of the pin, and upon drawing the line, it assumes the position shown in figs. 2 and 3. The float or sinker may be still more securely attached by doubling the loop, as plainly shown in fig. 1.

What I claim, and desire to secure by Letters Patent, is—

In combination with the wire loop C, attached to the float or sinker, the pin $d$, as and for the purposes described.

JAMES INGRAM.

Witnesses:
R. C. JENNINGS,
JOHN E. HAWKINS.